United States Patent
Andersson et al.

[11] 3,775,628
[45] Nov. 27, 1973

[54] INSULATED COIL FOR ARRANGEMENT IN A SLOT IN THE STATOR OR ROTOR OF AN ELECTRIC MACHINE

[75] Inventors: Anders R. Andersson; Anders Bjorklund; Lars-Goran Virsberg, all of Vasteras, Sweden

[73] Assignee: Allmanna Svenska Elektriska Aktiebolaget, Vasteras, Sweden

Foreign Application Priority Data
[30] Dec. 2, 1971  Sweden..........................15448

[22] Filed: July 10, 1972
[21] Appl. No.: 270,439

[52] U.S. Cl................ 310/208, 156/54, 161/163, 174/120 SR, 336/206
[51] Int. Cl............................................. H01f 27/32
[58] Field of Search................... 336/206; 161/163, 161/171; 174/120, 120 SR, 121, 121 SR; 310/208, 214, 215; 156/54

[56] References Cited
UNITED STATES PATENTS

| | | | |
|---|---|---|---|
| 2,656,290 | 10/1953 | Berberich et al. | 174/121 SR |
| 1,118,446 | 11/1914 | Roos | 336/206 |
| 3,549,926 | 12/1970 | Pentland | 336/206 X |
| 3,215,590 | 11/1965 | Purvis | 161/163 X |
| 3,523,061 | 8/1970 | Purvis | 161/163 X |
| 2,917,570 | 12/1959 | Wolff et al. | 174/120 SR |
| 753,461 | 3/1904 | Anderson | 336/206 |
| 3,019,286 | 1/1962 | Andersson et al. | 174/121 |
| 2,707,204 | 4/1955 | Richardson et al. | 174/120 |
| 2,970,936 | 2/1961 | Richardson | 174/120 |

FOREIGN PATENTS OR APPLICATIONS
664,747  1/1952  Great Britain..................... 161/163

*Primary Examiner*—Thomas J. Kozma
*Attorney*—Jennings Bailey, Jr.

[57] ABSTRACT

A coil positioned in the slot of a stator or rotor of an electric machine is formed of a bundle of conductors arranged close together and insulated from each other and from the slot. The conductor insulation consists of corona resistant insulating material running longitudinally of the conductor and surrounding the parts of the conductors facing the main insulation which surrounds the bundle of conductors and also overlies at least those part of the faces of the conductors which face the adjacent conductors which parts are situated nearest the tape facing the main insulation. The tape is formed of a linear unbranched or branched polymer having such thermal stability that the dielectric strength of a film of the polymer 50 microns in thickness, after ageing in air at 155°C for 25,000 hours, is at least 50 percent of the dielectric strength before the ageing and of mica in the form of small flakes.

11 Claims, 7 Drawing Figures

PATENTED NOV 27 1973 3,775,628

INSULATED COIL FOR ARRANGEMENT IN A SLOT IN THE STATOR OR ROTOR OF AN ELECTRIC MACHINE

BACKGROUND OF THE INVENTION

1. Field of the Invention

The invention relates to an insulated coil for arrangement in a slot in the stator or rotor of an electric machine.

2. The Prior Art

A coil which is arranged in a slot in the stator or rotor of an electric machine often comprises a bundle of several conductors arranged close together and provided with a conductor insulation to insulate the conductors from each other. The bundle may consist of turns of a single insulated conductor. It may also consist of several separate insulated conductors (strands) which are electrically connected, usually parallel-connected, to each other at the ends.

The conductor bundle is surrounded by a main insulation to insulate the bundle from the machine slot which has earth potential. The main insulation usually includes material which has strong resistance to corona attack, for example mica or siliconerubber and there are normally impregnating and pressing operations during its application around the bundle of conductors so that an insulation is obtained having no voids and tightly surrounding the conductor bundle. In practice it has been impossible to ensure the manufacture of coil insulations which are permanently free from inner spaces where corona may occur. The occurrence of small gas-filled voids even during the manufacture of the insulation cannot be completely avoided. Furthermore, voids and gaps in the insulation may arise as a result of ageing phenomena due to thermal and mechanical stresses during operation. In this case the boundary layer between the conductor insulation and main insulation is particularly subjected to stresses since the temperature is highest nearest the conductor and because of the mechanical stresses which arise with temperature alterations since the coefficients of thermal expansion for conductor and insulation are different.

When corona arises which affects the conductor insulation there is great risk of its being destroyed and weakened so that short-circuiting between adjacent turns of a single insulated conductor or short-circuiting between strands may occur. In order to avoid this risk a conductor insulation is aimed at which has strong resistance to corona attack. A conventional embodiment of conductor insulation which also provides corona protection is one in which the conductor is wrapped with mica tape consisting of mica flakes attached usually with a resinous binder to a carrier material of glass cloth, for example. With respect to the occurrence of temporary steep over-voltages, for example connection overvoltages, which may cause great stress between adjacent turns in a coil, the requirements of the electrical strength of the conductor insulation are extremely high seen in relation to the stress occurring during normal operation. A normal rule is that insulation between adjacent turns shall be dimensioned to withstand a voltage equal to the rated voltage of the machine. In order to achieve sufficient electric strength with conductor insulation of conventional mica tape, a relatively thick insulation is required which is effected by winding on several layers of tape. This conductor insulation has several disadvantages. It requires considerable space, is expensive and the insulation is easily damaged by folds and cracks arising during the bending process or during other handling of the conductor while shaping the coil. Another type of conductor insulation where these disadvantages are less pronounced is an embodiment in which the insulation of the conductor consists of a layer of enamel of a type normally used for enamelling conducting wire and a wrapping of mica tape applied outside this enamel as corona protection. Because of the high electric strength of the wire enamel layer, the total thickness of the insulation can in this case be kept lower than when the conductor is only wrapped with mica tape. In order effectively to protect the enamel layer against corona and at the same time contribute somewhat to the electric strength, the outer wrapping of tape must be carried out with overlap between adjacent turns of the tape. In this case also the tape wrapping causes problems when the conductors are being bent. If the tape is loosely bound to the enamel layer below it, it has a tendency to slide apart when the conductor is bent. If, on the other hand, the tape is firmly attached to the layer of enamel, cracks may easily occur during the bending.

It is extremely desirable for the insulation and corona protection around the conductor to be as thin and take as little space as possible. In this way more conductor material can be incorporated in the coil and a greater effect is achieved for a given machine dimension or for a given effect the machine dimension can be reduced.

SUMMARY OF THE INVENTION

According to the present invention it has been discovered that it is possible to use considerably thinner conductor insulation, which at the same time forms the corona protection, in coils of the type described than in previously known coils, and at the same time achieve equally good electrical qualities in the coils.

The present invention relates to a coil to be arranged in the slot of a stator or rotor in an electric machine, comprising a bundle of several conductors arranged close together and provided with conductor insulation being corona resistant and containing mica to insulate the conductors from each other and a main insulation surrounding the bundle to insulate the bundle from the machine slot, the conductors having sides facing each other and at least one side facing the main insulation, characterised in that each side facing the main insulation and at least the parts located nearest each such side, of the sides facing adjacent conductors, is surrounded by a tape of insulating material acting as conductor insulation running in the longitudinal direction of the conductor, at least one layer of the tape being arranged between adjacent conductors and that the tape is built up of a linear unbranched or branched polymer having such thermal stability that the dielectric strength of a film of the polymer 50 microns in thickness, after ageing in air at 155°C for 25,000 hours, is at least 50 percent of the dielectric strength before the ageing and of mica in the form of small flakes.

The dielectric strength can be determined according to VDE 0345/1.65 S 17. According to the present invention it is possible in the area where the stresses are greatest, i.e. between the sides of the conductors which are facing the main insulation and the machine slot, to achieve effective corona protection using only one layer of the tap, whereas normally at least two layers must be used since in the latter case the tape must be applied with overlap between adjacent turns. According to the invention, therefore, the outer dimensions of the conductor bundle are considerably less than for a corresponding conductor bundle in which an identical tape of insulating material has been wound around the conductor with overlap in conventional manner. The fact that joints or gaps occur according to the present invention between the tape along the sides of the conductors in the coil described which are facing each other has not proved to be any disadvantage. This is explained because the stresses between the conductors are low during normal operation and any over-voltages which arise are very brief, as mentioned previously.

The present invention is especially intended for use in electric machines for operating voltages above 3 kV in view of the corona problems arising in such machines.

The conductor bundle may consist of several turns of a single insulated conductor which is bent to give the final shape of the bundle. It may also consist of several separate insulated conductors, often called strands, which are electrically joined to each other, usually parallel-connected, at their ends.

The main insulation may be designed in various well known ways and its construction does not form any part of the present invention. It may, for example, consist of a bandage of mica tape or mica sheet. These may be made of large mica flakes of conventional type which, for example with a varnish binder such as an alkyd resin or a thin thermoplastic film, are attached to a carrier material of paper, glass cloth or the like. The mica material may also consist of self-carrying tape or sheets of small mica flakes overlapping each other, manufactured by splitting ordinary mica. In this case the mica material is usually attached to a carrier material as well.

A binder may be applied on said mica tapes or arcs which, when the material is later applied around the conductor bundle, binds the various layers of the conductor insulation to each other. However, such a binder may even be supplied after the insulating material has been applied around the conductor bundle by means of an impregnation. As examples of suitable binder for the turns in the wrapping may be mentioned solventless resins such as epoxy resins and unsaturated polyester resins.

The main insulation may alternatively consist of silicon rubber, for example, applied in the form of a strip or paste around the bundle of conductors.

The conductor insulation which is the object of the present invention as mentioned earlier, is built up of a linear unbranched or branched polymer having special properties and of mica in the form of small flakes.

According to one embodiment of the invention the tape of insulating material is built up of a coherent film of the polymer with the mica flakes homogenously embedded as filler.

According to another embodiment of the invention the tape of insulating material is built up of a coherent film of the polymer with the mica flakes arranged as a layer on one or both surfaces of the film.

According to another embodiment of the invention the tape of insulating material is built up of a mixture of mica flakes and short fibres of the polymer which form a mat.

As examples of suitable polymers may be mentioned polyamide imides, polyamides, polyimides, polymers based on polyhydantoin, polyethylene glycol terephthalate, polycarbonate and polysulphon.

The mica flakes suitably have a size less than 2 mm$^2$.

If the mica flakes are embedded in the polymer, the content of mica is preferably 25 – 75 percent of the total weight of mica and polymer.

If the mica flakes are arranged on the surface of a polymer film, they are suitably attached to this and to each other by a thin layer of a resinous binder so that a layer of falkes overlapping each other is obtained. The layer, or each layer of mica flakes, then has a thickness of preferably 1 – 50 microns.

If the tape of corona-resistant material is formed of a mixture of small mica flakes and short fibres of the polymer the percentage of mica is preferably 25 – 75 percent of the total weight of mica and fibres. Such a tape can be manufactured by mixing fibres and mica flakes to a pulp and then shaping the mixture of components to a sheet of material in accordance with methods similar to those used in the manufacture of paper. The fibres have suitably a length of 0.5 – 25, preferably 1 – 10 mm and a thickness of 1 – 50, preferably 5 – 25 microns. The conductor insulation, i.e. the polymer with incorporated mica flakes or layers of mica flakes on the surface has a thickness of suitably 10 – 200 microns, preferably 25 – 125 microns.

The conductor insulation is suitably attached to the conductor with a poreless resinous binder having high elongation at rupture and good stiffness. As examples of suitable binders may be mentioned flexible polyurethane resins, epoxy resins modified with polyamides, polyester resins modified with isocyanates, epoxy resins modified with polyurethane resins and certain types of rubber. Such resinous binders are also suitable as binders for the previously mentioned attachement of mica to the surface of a polymer film.

If the conductor has two sides facing the main insulation it may be advantageous to use one tape for each side instead of using one tape which surrounds both sides. Thus when the conductor is bent the tape on one of said sides does not affect the tape on the other side since there is no connecting part of the tape. Mechanical stresses on one tape are therefore not transferred to the other tape.

BRIEF DESCRIPTION OF THE DRAWINGS

The invention will be described in more detail by means of a number of examples with reference to the accompanying drawings in which.

DESCRIPTION OF THE PREFERRED EMBODIMENTS

EXAMPLE I

A resinous binder was prepared from 74 parts by weight of a copolymerisate of equal parts polyhexamethylene adipamid and polycaprolactam having an average molecular weight of about 2500, 24 parts by weight of an epoxy resin consisting of diglycidyl ether of bisphenol A having an epoxy equivalent of 190 (for example DER 331 from Dow Chemical, USA) and 2 parts by weight dicyandiamide. This resin, dissolved to a 25 percent solution in equal parts methanol and trichloroethylene, is applied as a thin layer on one side of a film 50 microns thick and 25 mm wide, consisting of equal parts by weight polyimide and small mica flakes, the mica flakes being uniformly distributed in the volume of the film. When the solvent had evaporated the film was applied as conductor insulation 11, with the resinous binder 12 facing inwards along the conductor which is 3 × 8 mm so that the edges 13 and 14 overlapped each other in the longitudinal direction of the conductor. The product thus formed was then placed in a mould and subjected to heating to 200°C for some minute, so that the resinous binder melted and became cured.

Figure 1:
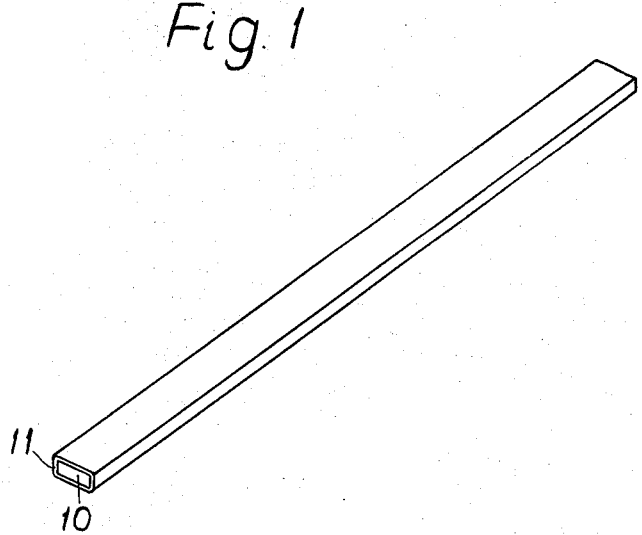
FIG. 1 shows in perspective a conductor according to the invention provided with conductor insulation prior to bending, FIG. 2 the same conductor in cross section on a larger scale, FIG. 3 a side view of a coil produced by bending the conductor according to FIGS. 1 and 2 and provided with main insulation, FIG. 4 the same coil in cross section and FIGS. 5 – 7 alternative embodiments of the conductor according to FIGS. 1 and 2 shown in cross section.
Figure 2:
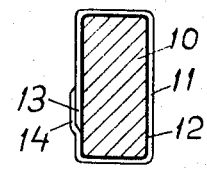
Figure 3:
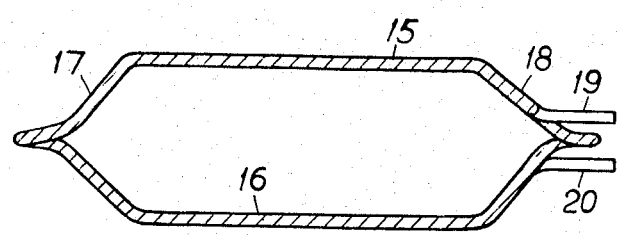
Figure 4:
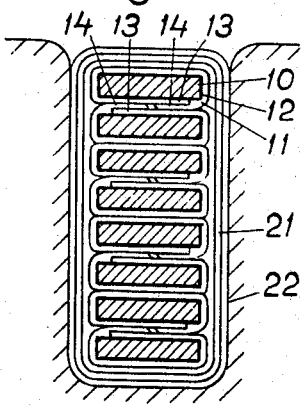

The conductor 10 provided with insulating material 11 was bent to a coil having several turns of the conductor lying close to each other as shown in FIGS. 3 and 4, respectively. (These figures show the coil when the main insulation has been applied). The said turns of the conductor lie close together and form the conductor bundle of the coil. As is clear from FIG. 3 the conductor is bent so that the coil has straight parts 15 and 16 intended to be placed in the machine slots and curved end parts 17 and 18 which come outside the slots. The terminals of the coil are designated 19 and 20.

The conductor bundle is then wrapped in turns with, for example, half overlap, with a 25 mm wide mica tape consisting of a 0.09 mm thick self-carrying layer of small mica flakes overlapping each other fixed to a 0.04 mm thick woven glass tape with 0.006 mm thick polyethylene glycol terephthalate foil. Such an insulating tape is described in British patent No. 939,747. When the bundle has been provided with a wrapping 21 of, for example, thirty layers of mica tape one on top of the other, the winding is dried first at a pressure of 0.1 mm Hg and a temperature of 40°C, after which an impregnating resin is supplied at the same pressure. When all the impregnating resin has been supplied, the pressure is raised to, for example 25 kg/cm². The impregnating resin may consist of an epoxy resin consisting, for example of 85 parts "Araldit F", 100 parts "Curing agent 905" (both from Ciba AG, Switzerland) and 15 parts phenyl glycidyl ether. So that the impregnating resin shall not penetrate out of the insulation during the subsequent curing process the impregnated conductor bundle with the wrapping of mica tape may be surrounded with a sealing tape of polytetrafluoroethylene or the like. The coil is then placed in a moulding tool to cure the impregnating resin. Curing takes place at a temperature of about 160°C for 4 to 6 hours. The coil is applied with the straight slot parts in the machine slot 22 as shown in FIG. 4.

EXAMPLE 2

A coil was manufactured in the manner indicated in Example 1, with the difference that as resinous binder to attach the polymer film to the conductor a semicured polyimide resin was used, applied on one or both sides of the film. The polymer film was attached to the conductor by heating to 320°C for 3 minutes.

EXAMPLE 3

A coil was manufactured in the manner indicated in Example 1, with the difference that instead of the polymer film for the conductor insulation 11, a film 50 microns thick and 25 mm wide was used consisting of polyethylene glycol terephthalate coated on both sides with a layer approximately 10 microns thick of mica flakes overlapping each other and having a diameter (greatest width) of at the most 53 microns, which are bound to the polymer film and to each other with a binder (for example MICA-SEAL MMS-2 from McMillan Radiation Labs. Inc. USA).

EXAMPLE 4

A coil was manufactured in the manner indicated in Example 1 with the difference that the mica-coated polymer film described in Example 3 is used and that this film is attached to the conductor with a resinous binder consisting of a polyamide-modified epoxy resin (for example "AF-42" from Minnesota Mining and Manufacturing Company). The resin is then dissolved in a solvent and coated in a thin layer on the conductor and on one surface of the film at the overlapping point. When the solvent has evaporated the product thus formed is placed in a mould and subjected to heating to 165°C. Furthermore, as impregnating resin in the main insulation an unsaturated polyester resin is used manufactured from adipic acid (11 mole %), phthalic acid anhydride (11 mole %) maleic acid anhydride (23 mole %) and ethylene glycol (55 mole %) and provided with diallyl phthalate in such a quantity that the diallyl phthalate comprises 40 percent of the total weight of polyester resin and diallyl phthalate and also with benzoyl peroxide in a quantity corresponding to 1 percent of the weight of the mixture. The polyester resin itself is manufactured by reaction of a mixture of said acids and the alcohol in inert atmosphere by increasing the temperature to 220°C and maintaining this temperature until the acid number of the reaction product is about 30. The coil is dired prior to impregnation at a pressure of less than 1mm Hg and the resin is cured after the impregnation at a temperature of 130°C for 1 hour.

EXAMPLE 5

Figure 5:
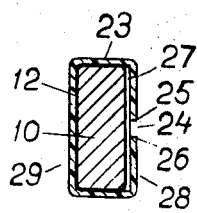

A coil is manufactured in the manner indicated in Example 1 with the difference that instead of the tape of insulating material described there a tape 23 according to FIG. 5 of the same insulating material and the same thickness but having a width of 20 mm is used. A gap 24 thus appears between the two edges 25 and 26 of the tape. Under the tape on the side where the gap is located is a polymer film 27, for example of polyethylene glycol terephthalate having a thickness of 20 microns, this film being attached to the conductor and to the film 23 with the resinous binder 12. When the conductors are placed in the slot, this is done so that one side 28 with a gap 24 of one conductor is turned towards a side 29 without a gap in the adjacent conductor. Of course the width of the tape 23 of insulating material can be chosen so that the gap will be zero, i.e. the edges 25 and 26 meet.

EXAMPLE 6

Figure 6:
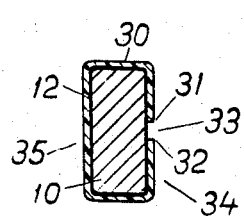

In a coil with parallel-connected strands, the stresses between these are low. FIG. 6 shows a suitable insulation for such a strand. The tape of insulating material 30 has a thickness of 75 microns and a width of 20 mm. The dimensions of the conductor are 3 × 8 mm as before. The tape consists of a mat built up of a mixture of equal parts by weight of small mica flakes and short fibres of an aromatic polyamide (for example NOMEX M from Du Pont, USA). The tape is attached to the conductor 10 with a resinous binder 12 consisting of a polyamide-modified epoxy resin (for example "AF-42" from Minnesota Mining and Manufacturing Company). The resin is dissolved in a solvent and coated in a thin layer on the conductor. When the solvent has evaporated the tape 30 is attached to the conductor by placing the conductor provided with the tape in a mould tool and subjecting them to heating up to 165°C for 30 minutes. A gap 33 is formed between the edges 31 and 32 of the tape, which possibly may be zero in width. The conductors are placed in the slot 22 in such a way that a side 34 with gap 33 of one conductor abuts a side 35 without gap of an adjacent conductor.

The main insulation 25 may be of the same type as that in Example 1.

EXAMPLE 7

Figure 7:
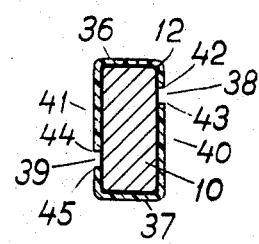

A coil is manufactured in the manner indicated in Example 6 with the difference that instead of a tape 30, two tapes 36 and 37 of the same insulating material are used, each being 9 mm wide. Each tape 36, 37, is applied as shown in FIG. 7, displaced in relation to a plane through the middle of the short sides of the conductor so that the gaps 38 and 39 between the edges of the tape will be situated on opposite sides of a plane through the middle of the long sides of the conductor. In this way the gaps in two adjacent conductors will not cover each other at any point if they are stacked one on top of the other with a side 40 of one conductor abutting a side 41 of an adjacent conductor. This ensures that there is at least one layer of the insulating tap arranged between adjacent conductors. The gaps 38 and 39 may be zero, i.e. the two edges may meet each other on both sides of the conductor, but on opposite sides of a plane through the middle of the long sides.

Of course mica tape having large mica flakes or other commercially available completely polymerisable resins, such as for example asphalt, can be used for the main insulation in the coils described in the Examples. Although many unsaturated polyester resins and epoxy resins suitable for impregnating electric insulations are known, a few more examples of such resins will be mentioned. For example, an impregnating resin consisting of 60 parts by weight of a reaction product of 3 moles maleic acid anhydride, 1 mole adipic acid, 4.4 moles ethylene glycol manufactured according to the process described earlier, with an acid number of 30, and of 40 parts by weight diallylphthalate containing 0.75 % benzoyl peroxide may be used, or an impregnating resin consisting of 70 parts by weight of a reaction product of 1 mole fumaric acid, 1 mole phthalic acid and 2.2 moles propylene glycol reacted to an acid number of 25 and of 30 parts by weight monostyrene containing 0.5 % benzoyl peroxide. Amongst suitable epoxy resins may be mentioned a product consisting of 100 parts by weight "Epon 828" (shell Chemical Co.) and of 65 parts hexahydrophthalic acid anhydride, or a product consisting of 100 parts by weight "Dow 331" (Dow Chemical Co.) and 65 parts by weight tetrahydrophthalic acid anhydride.

We claim:

1. Coil to be arranged in the slot of a stator or rotor in an electric machine, comprising a bundle of several conductors arranged close together and provided with conductor insulation to insulate the conductors from each other and a main insulation surrounding the bundle to insulate the bundle from the machine slot, the conductors having sides facing each other and at least one side facing the main insulation, said conductor having conductor insulation comprising tape means of insulating material running in the longitudinal direction of the conductor, the tape means surrounding said one side facing the main insulation and at least those parts of the sides facing adjacent conductors which are situated nearest said one side, at least one layer of the tape means being positioned between adjacent conductors, the tape means comprising a linear unbranched or branched polymer having such thermal stability that the dielectric strength of a film of the polymer 50 microns in thickness, after ageing in air at 155°C for 25,000 hours, is at least 50 percent of the dielectric strength before the ageing and mica in the form of small flakes.

2. Coil according to claim 1, in which the tape means of insulating material is built up of a coherent film of the polymer with the mica flakes embedded as filler.

3. A coil according to claim 1, in which the tape means of insulating material is built up of a coherent film of the polymer with the mica flakes arranged as a layer on at least one side of the film.

4. Coil according to claim 1, in which the tape means of insulating material is built up of a mixture of mica flakes and short fibres of the polymer.

5. Coil according to claim 1, in which the tape means of insulating material is wider than the circumference of the conductor and is folded around the conductor with the edges overlapping each other.

6. Coil according to claim 5, in which said tape means comprises a single tape.

7. Coil according to claim 4, in which the tape means comprises a tape of insulating material surrounding only one side of the conductor facing the main insulation and at least those parts of the sides of the conductor facing adjacent conductors which are situated nearest said one side, another tape of insulating material surrounding one side of the conductor positioned opposite to said one side facing the main insulation and at least those parts of the sides of the conductor facing adjacent conductors which are situated nearest to said side positioned opposite to said one side facing the main insulation.

8. Coil according to claim 6, in which said two tapes overlie parts only of the sides facing adjacent conductors and the gap between the edges of the two tapes on one side of a first conductor facing an adjacent conductor is displaced laterally in relation to the gap between the edges of the two tapes on the side of the adjacent conductor facing the first conductor so that at least one layer of tape is present between the conductors.

9. Coil according to claim 1, in which the tape means comprises a single tape surrounding one side of the conductor facing the main insulation, one side of the conductor positioned opposite to said one side facing the main insulation, one side of the conductor facing an adjacent conductor and at least those parts of another side of the conductor facing another adjacent conductor which are situated nearest said one side of the conductor facing the main insulation and said one side positioned opposite to said side facing the main insulation.

10. Coil according to claim 1, in which the main insulation comprises a wrapping of a tape or sheet shaped insulating material with mica as component in order to achieve good electric strength.

11. Coil according to claim 1, in which the polymer consists essentially of a substance selected from the group consisting of polyamide imides, polyamides, polyimides, and polymers based on polyhydantoin, polyethylene glycol terephthalate, polycarbonate and polysulphon.

* * * * *

Disclaimer 3,775,628.—*Anders R. Andersson, Anders Bjorklund,* and *Lars-Goran Virsberg,* Vasteras, Sweden. INSULATED COIL FOR ARRANGEMENT IN A SLOT IN THE STATOR OR ROTOR OF AN ELECTRIC MACHINE. Patent dated Nov. 27, 1973. Disclaimer filed Mar. 26, 1974, by the assignee, *Allmanna Svenska Elektriska Aktiebolaget.*

Hereby disclaims the term of the patent subsequent to Mar. 27, 1990.

[*Official Gazette July 1, 1975.*]